United States Patent [19]

Lower et al.

[11] Patent Number: 4,507,365
[45] Date of Patent: Mar. 26, 1985

[54] CHEMICALLY MODIFIED ASPHALT PROTECTIVE COATING SOLUTION AND CONCRETE COATED WITH SAME

[75] Inventors: Loren D. Lower, Granville; Alfred Marzocchi, Newark; Frederick H. Ponn, III, Granville; Michael G. Roberts, Newark, all of Ohio

[73] Assignee: Owens-Corning Fiberglas Corporation, Toledo, Ohio

[21] Appl. No.: 553,618

[22] Filed: Nov. 21, 1983

[51] Int. Cl.³ .................... C08L 95/00; B32B 11/04
[52] U.S. Cl. .................................. 428/489; 428/703; 524/476; 525/54.5
[58] Field of Search ............... 428/489, 703; 525/54.5; 524/476

[56] References Cited

U.S. PATENT DOCUMENTS

| | | | |
|---|---|---|---|
| 4,325,854 | 4/1982 | Roberts et al. | 524/476 |
| 4,332,707 | 6/1982 | Roberts et al. | 524/476 |
| 4,394,481 | 7/1983 | Grossi et al. | 525/54.5 |
| 4,419,489 | 12/1983 | Grossi et al. | 525/54.5 |

Primary Examiner—William J. Van Balen
Attorney, Agent, or Firm—Ronald C. Hudgens; Robert F. Rywalski

[57] ABSTRACT

Protective coating solutions for cementitious substrates are disclosed which comprise a minor amount of a cyclohexane based organic solvent on a major amount of an asphaltic material. The asphaltic material is a blend of asphalt with the reaction product of asphalt, a vinyl aromatic monomer, a rubber and an unpolymerized acrylamide.

14 Claims, No Drawings

CHEMICALLY MODIFIED ASPHALT PROTECTIVE COATING SOLUTION AND CONCRETE COATED WITH SAME

TECHNICAL FIELD

The present invention relates to asphalt compositions, and, more particularly, it relates to chemically modified asphalt coating solutions. Even yet more particularly, it relates to environmentally acceptable chemically modified asphalt protective coating solutions for use in forming membranes on cementitious substrates.

BACKGROUND AND SUMMARY OF THE INVENTION

U.S. Pat. No. 4,394,481 and allowed copending application U.S. Ser. No. 453,029, now U.S. Pat. No. 4,419,489, both of which are hereby incorporated by reference, disclose chemically modified asphalts produced by reacting asphalt, a vinyl aromatic monomer, a rubbery polymer and an acrylamide. They are indicated to be of utility as protective coatings for various substrates including cementitious substrates. Solutions, as exemplified by a composition formed by reacting an AC-5 paving grade asphalt, styrene, Solprene 1205 C styrene-butadiene copolymer and dimethylaminopropylmethacrylamide, in a solvent of about 80 weight percent toluene and 20 weight percent of normal hexane, have demonstrated outstanding characteristics for the treatment of cementitious substrates, for example, the exterior surfaces of basements to provide a protective coating. The solutions have good shelf life; the solvent has good solvation properties; they dry at a desirable rate and show good wetout on the cementitious substrate. Upon evaporation of the solvent, the residual chemically modified asphalt shows good adhesion, has good elongation and elastic recovery, is tough and shows good cold temperature flex.

Unfortunately, the solvent employed does not satisfy all environmental regulations, and a new coating solution is consequently needed which will be environmentally acceptable and which will have the properties indicated above.

In accordance with the present invention, there is provided an environmentally acceptable protective coating solution having good shelf life, said solution comprising a major amount of an asphaltic material and a minor, but effective, solvating amount of cyclohexane based solvent, said solvent being an admixture of at least about 75% (wt) cyclohexane, 15%–25% toluene and up to 10% n-hexane. The asphaltic composition is a blend of a minor amount of asphalt having a viscosity of less than about 120,000 cps (at 140° F.) and a major amount of the product produced by chemically reacting a vinyl aromatic monomer, asphalt having a viscosity of less than 120,000 cps (at 140° F.), a rubbery polymer and an acrylamide. The solvent employed satisfies environmental regulations. The presence of asphalt as a blend with the above-indicated chemically modified asphalt is important in producing a solution having good shelf life, and, surprisingly, the presence of such asphalt as a blend with the chemically modified asphalt will not render the residual coating material unacceptable from an adhesion, elongation, elastic recovery, toughness or cold temperature flex viewpoint. The ability to include such asphalt with a chemically modified asphalt is also quite significant from a cost advantage viewpoint.

DESCRIPTION AND INDUSTRIAL EXPLOITATION

Protective coatings, for example, for cementitious substrates, like the exterior of basement walls, can be easily formed by simply spraying the coating solutions of this invention onto such substrates and allowing the solvent to evaporate. The solutions may be formed by mixing the ingredients in any convenient manner.

Desirably, the asphaltic material of the solutions of this invention, that is the solids, will be at least about 60% by weight of the solution and preferably about 65 to about 75% by weight of the solution with the solvent desirably being less than about 40% and preferably about 25 to about 35% by weight of the solution. The asphaltic material preferably will comprise about 65% to about 95% by weight of the product produced by reacting the asphalt, vinyl aromatic monomer, acrylamide and rubbery polymer and about 5 to about 35% by weight of asphalt. While cyclohexane alone is not suitable as a solvent because of unsatisfactory solvation characteristics and toluene is unsatisfactory because it is too slow drying, a mixture of the two represents an outstanding solvent. An especially preferred solvent is about 80% by weight of cyclohexane and about 20% by weight of toluene.

The chemically modified asphalt compositions produced by reacting an acrylamide, a vinyl aromatic monomer and a rubbery polymer with asphalt for use in the present invention are obtained by heating the ingredients at an elevated temperature for several hours. Generally, it will be noted that the reactant system is initially crumbly and breaks apart easily with a pronounced propensity for phase separation; in short, it is initially a heterogeneous, cheesy type material. Upon reaction, however, such system converts to a homogeneous tough material, i.e., a material with no substantial phase separation characteristics and one with increased tensile strength and elastomeric properties. Preferably, the reacting is done by heating at a temperature of at least 120° C., preferably at least 150° C., for about 10 hours, and most desirably, at a temperature of about 160° C. to about 190° C. for about 20 hours to about 24 hours.

The acrylamides employed as a reactant in the present invention are unpolymerized and have a reactive double bond. Preferably, the acrylamide will be a compound of the formula

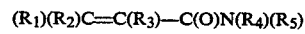

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms or preferably a radical of the formula

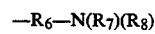

wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is a compound of the formula

The double bond in the acrylamides provides for the ability to chemically incorporate the acrylamide into the chemically modified asphalt composition. Additionally, the amino groups present in the acrylamides provide for highly desirable polarity which serves to greatly enhance the adhesive bonding of the present compositions to cementitious substrates. Representative acrylamides are set forth in the incorporated patent.

The asphalt employed to form the chemically modified asphalt will have a viscosity of less than about 120,000 cps (at 140° F.), preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Preferably, the asphalt which will be employed is an asphalt cement of the type typically used for road paving, repair and maintenance purposes. Such asphalts typically have penetrations ranging between about 20 to about 200 with AC-5 paving grade asphalt being especially suitable.

Such same non chemically modified asphalts as are used to form the above chemically modified asphalt will be employed to form the blend of asphalt with the chemically modified asphalt.

As the polymerizable vinyl monomer, use is preferably made of monofunctional vinyl aromatic monomer having a general formula:

$$R_1-C=C-R_3$$
$$\;\;\;\;|\;\;\;\;|$$
$$\;\;\;R_2\;\;R_2$$

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl, e.g., a $C_1$ to $C_5$ alkyl, and $R_3$ is hydrogen, lower alkyl or one of the following groups:

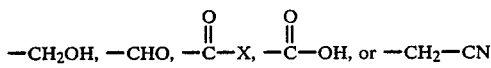

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula:

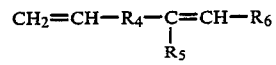

wherein $R_4$ is a divalent aromatic group containing 6 to 12 carbon atoms, and preferably a phenylene group; and $R_5$ and $R_6$ have the same meaning as is described above with respect to $R_2$ and $R_3$, respectively, for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C elastomer.

The amount of the various ingredients used to form the chemically modified asphalt component of the solution may vary over a wide range. Preferably, however, the acrylamide will be employed in an amount of about 0.1%, and most desirably about 0.5%, to about 15%, based on the weight of asphalt, the vinyl aromatic will be used in an amount of about 0.5 to about 35% based on the weight of the asphalt, and the rubbery polymer will be employed in an amount of about 0.5 to about 30% based on the amount by weight of asphalt. In accordance with the best mode of practicing the present invention, the materials and the amounts employed will be selected to produce a chemically modified asphalt material having a viscosity of about 1200 to about 2500 cps (at 285° F.) and most desirably about 1800 to about 2000 cps.

While the above describes the invention with sufficient particularity to enable those skilled in the art make and use same, nonetheless further examplification follows.

EXAMPLE

Using a charge of about 80% by weight of AC-5 paving grade asphalt, 0.5% by weight of dimethylaminopropylmethacrylamide (DMAPMA), about 9.5% by weight of styrene, and about 10% by weight of Solprene 1205C styrene-butadiene elastomer having a molecular weight of about 80,000 to about 100,000, a composition was produced as follows. Asphalt, at a temperature of about 250° F. to about 310° F. was pumped into a reactor equipped with an agitator and a reflux condenser and followed by the addition of the rubber, DMAPMA and styrene. The ingredients were then heated at a temperature of about 348° F. for about 24 hours with agitation and under reflux. The reacted material has a viscosity of 1800–2000 cps at 285° F.

Two coating solutions in which the solvent, in each instance, was about 20% by weight toluene and about 80% by weight cyclohexane were prepared. In one, the solids content was about 67.5% by weight asphaltic material, and the asphaltic material, in turn, was about 70% by weight of the above produced chemically modified asphalt and about 30% by weight of AC-5 asphalt. In the other sample, the solids content was about 71% by weight of which about 73% was the above-indicated chemically modified asphalt and about 27% by weight was the AC-5 asphalt. These solutions can be prepared in any convenient manner but, preferably, molten asphalt will be added to the molten chemically modified asphalt followed by the addition of toluene and then the cyclohexane.

These solutions are outstandingly adapted to be sprayed onto cementitious substrates, for example, basement walls to provide a protective coating with the solutions having good shelf life, good solvation characteristics, good drying rates and good wetout and with the resulting asphaltic material, after solvent evaporation, having good adhesion, elongation, elastic recovery, toughness and cold temperature flex. The above solutions, as well as a solution in which the asphaltic material was about 85% by weight of the above-indicated chemically modified asphalt and about 15% by weight of AC-5 in the same solvent solution with a solids content of about 65%, all exhibited good shelf life even after two months of storage. In contrast, if a blend is not employed and the only solid material is the chemically modified asphalt, inferior shelf lives result and, consequently, would require inconvenient, time consuming, more intensive mixing prior to utilization as a coating. Those skilled in the art will readily appreciate the detrimental impact of unsatisfactory shelf-life when one considers that materials such as those presently involved are typically shipped in 55 gallon drums.

While the above describes our invention, it will, of course, be apparent that modifications are possible which, pursuant to the patent statutes and laws, do not depart from the spirit and scope thereof.

We claim:

1. An environmentally acceptable protective coating solution having good shelf life, said solution comprising a major amount of an asphaltic material and a minor, but effective solvating amount of a cyclohexane based solvent, said solvent being an admixture of at least about 75% (wt) cyclohexane, 15%–25% toluene and up to 10% n-hexane, said asphaltic composition being a blend of a minor amount of asphalt having a viscosity of less than about 120,000 cps (at 140° F.), and a major amount of the product produced by reacting a vinyl aromatic monomer, asphalt having a viscosity of less than 120,000 cps (at 140° F.), a rubbery polymer and an acrylamide.

2. The coating solution of claim 1 wherein said vinyl aromatic monomer is styrene.

3. The coating solution of claim 2 wherein said rubbery polymer is a homopolymer of diene or a copolymer of diene and an olefinically unsaturated monomer.

4. The coating solution of claim 3 wherein said rubbery polymer is a styrene-butadiene copolymer.

5. The coating solution of claim 4 wherein said asphalt of said blend and the asphalt employed in forming said reacted product has a viscosity of about 40,000 to about 60,000 cps (at 140° F.).

6. The composition of claim 5 wherein said acrylamide is a compound of the formula

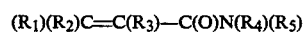

$(R_1)(R_2)C=C(R_3)-C(O)N(R_4)(R_5)$ wherein $R_1$, $R_2$ and $R_3$ are independently selected from hydrogen and a $C_1$–$C_3$ alkyl; $R_4$ and $R_5$ are independently selected from hydrogen, a $C_1$–$C_3$ alkyl and a radical of the formula

$-R_6-N(R_7)(R_8)$ wherein $R_6$ is an alkylene group of 1 to 5 carbon atoms and $R_7$ and $R_8$ are independently selected from hydrogen or a $C_1$–$C_3$ alkyl.

7. The composition of claim 6 wherein $R_4$ or $R_5$ is said radical of the formula $-R_6-N(R_7)(R_8)$.

8. The composition of claim 7 wherein $R_1$ and $R_2$ are hydrogen.

9. The composition of claim 3 wherein $R_6$ is ethylene or propylene.

10. The composition of claim 8 wherein $R_3$, $R_7$ and $R_8$ are hydrogen or methyl.

11. The composition of claim 9 wherein said acrylamide is dimethylaminopropylmethacrylamide.

12. The composition of claim 1 wherein said asphaltic material is at least about 60% by weight and said solvent is less than about 40% by weight.

13. The composition of claim 11 wherein said solvent is about 20% (wt) toluene and 80% (wt) cyclohexane.

14. A concrete surface having the coating solution of claim 1 thereon.

* * * * *